March 12, 1957  T. E. GOODWIN  2,785,366
CONSTANT SPEED, DIRECT CURRENT MOTOR AND CONTROL
Filed May 14, 1954  3 Sheets-Sheet 1
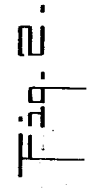
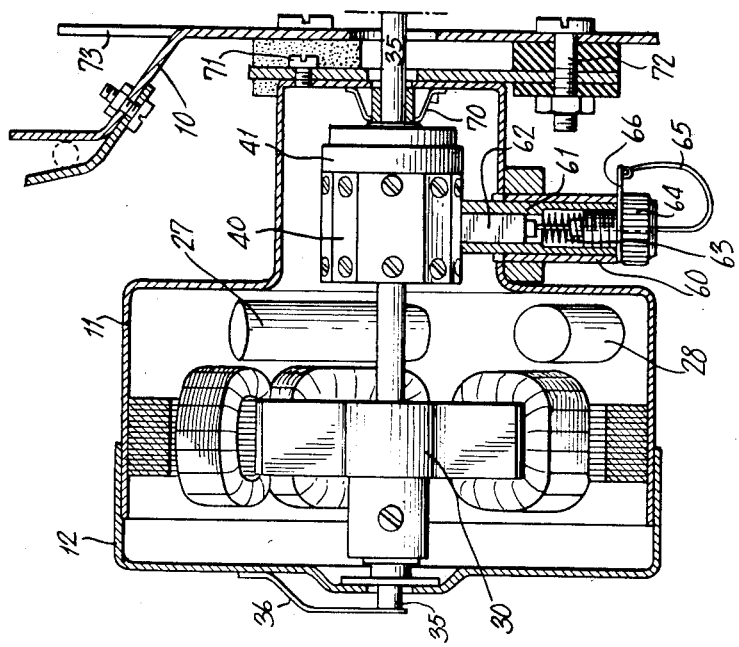
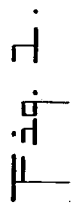
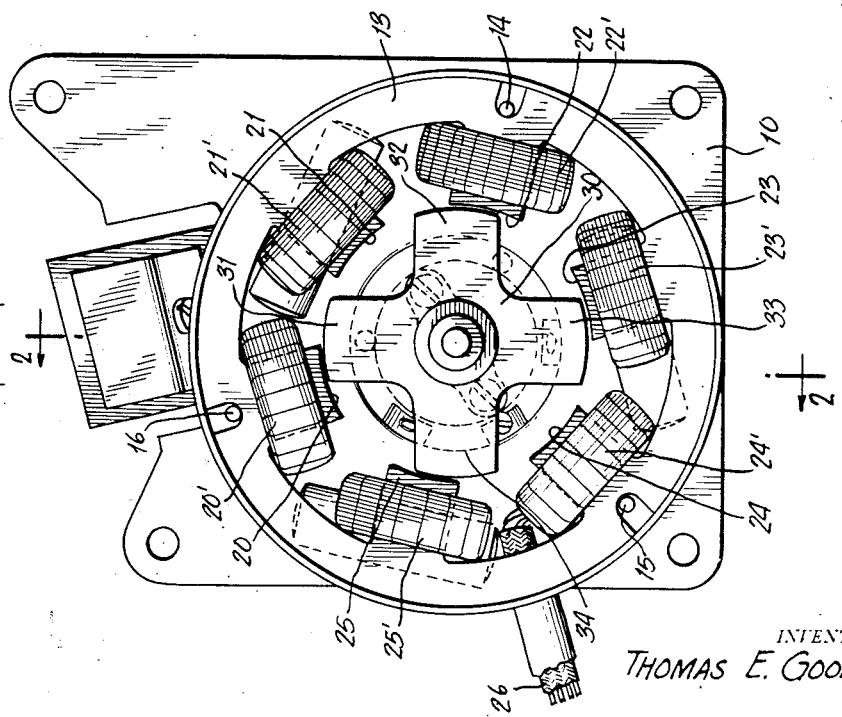
INVENTOR.
THOMAS E. GOODWIN
BY Darby + Darby
ATTORNEYS March 12, 1957 T. E. GOODWIN 2,785,366
CONSTANT SPEED, DIRECT CURRENT MOTOR AND CONTROL
Filed May 14, 1954 3 Sheets-Sheet 2
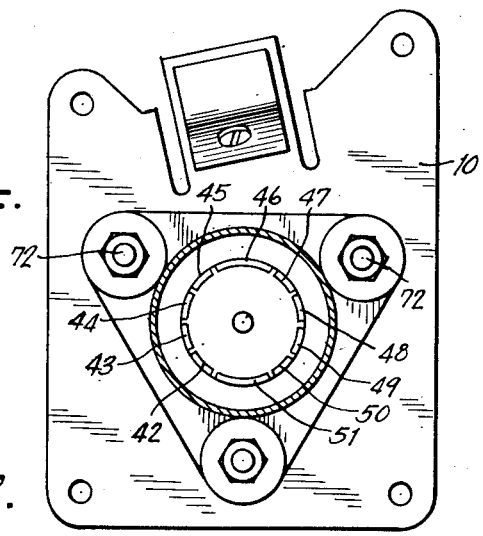
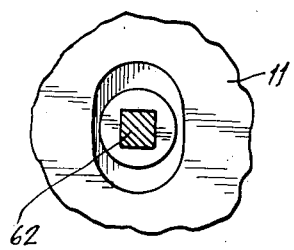
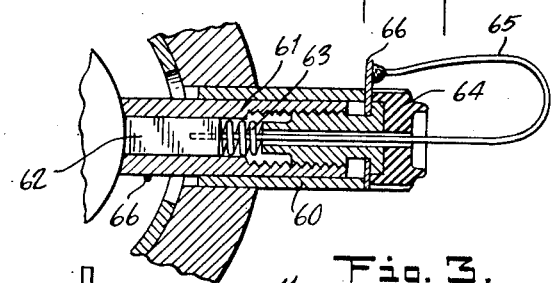
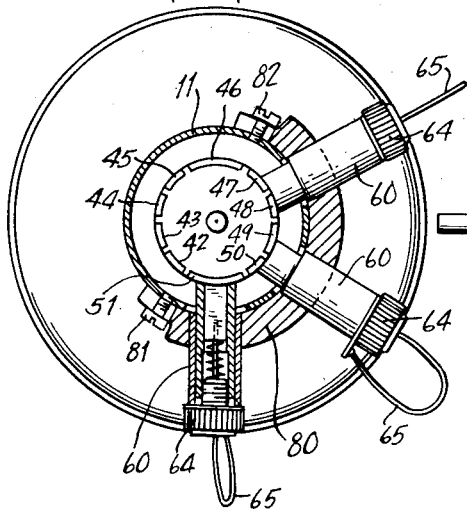
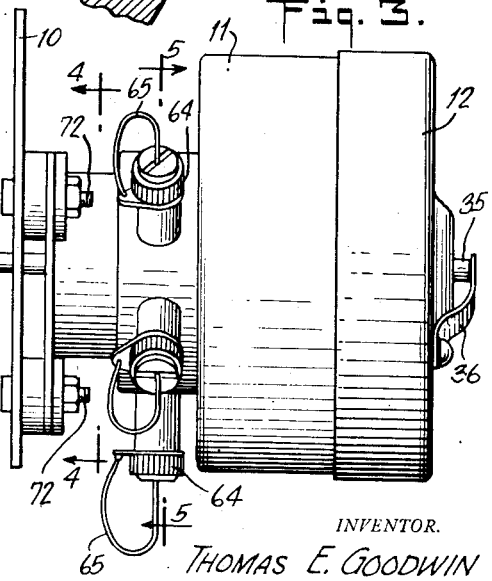
INVENTOR.
THOMAS E. GOODWIN
BY Darby & Darby
ATTORNEYS

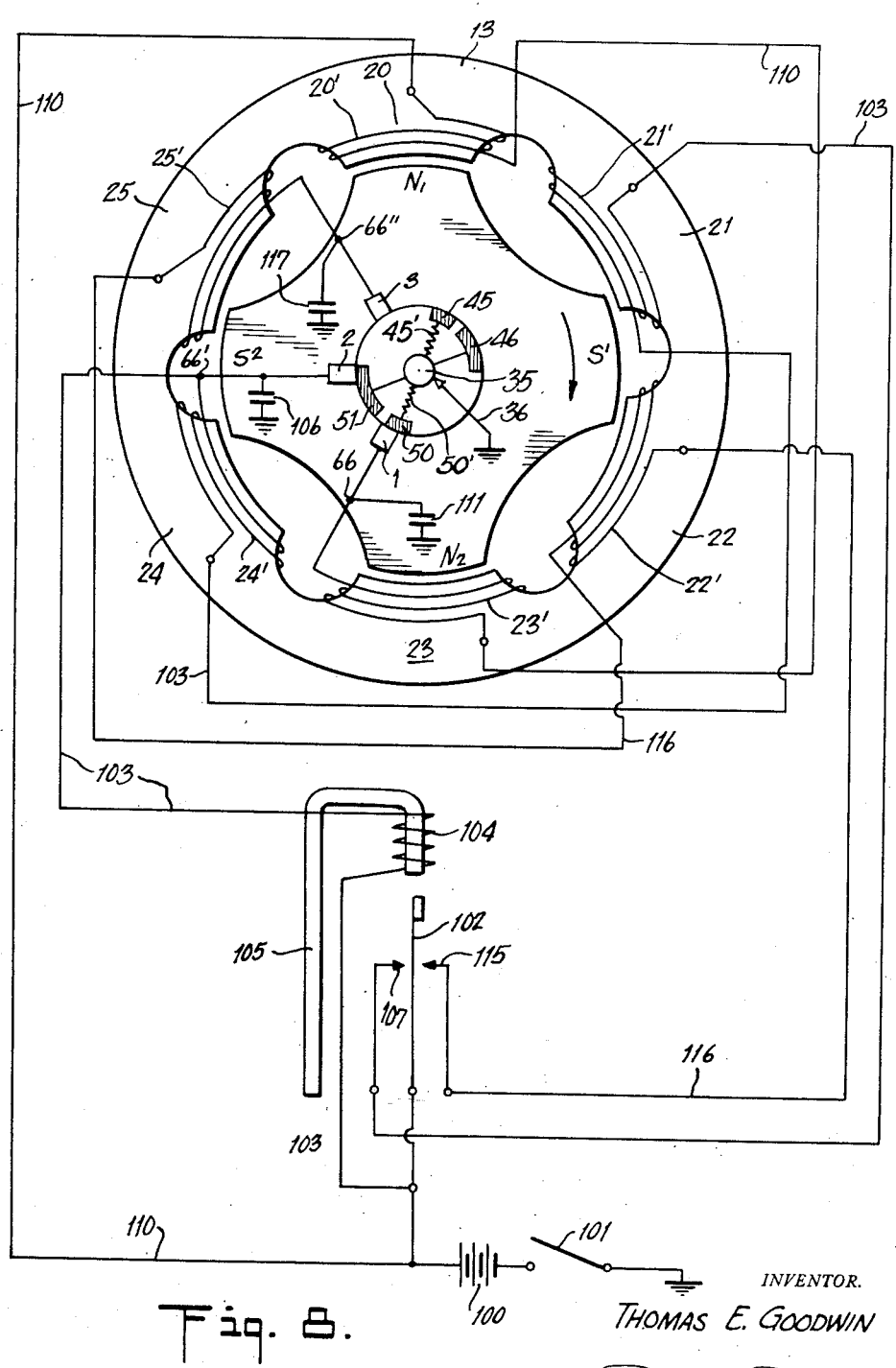

United States Patent Office 2,785,366
Patented Mar. 12, 1957

2,785,366

CONSTANT SPEED, DIRECT CURRENT MOTOR AND CONTROL

Thomas E. Goodwin, Baldwin, N. Y., assignor to J. C. Warren Corporation, Freeport, N. Y., a corporation of New York Application May 14, 1954, Serial No. 429,823

4 Claims. (Cl. 318—254)

This invention relates to an electric motor and speed control therefor, particularly to a direct current motor adapted to be operated from a tuned vibrator source, the motor being characterized by the fact that it is a direct current motor having extremely close speed regulation.

In the manufacture of devices such as wire and tape recording and play-back machines, the problem involved in faithful reproduction of the recorded material requires that the drive for the tape or wire be extremely closely controlled to avoid distortion. Commonly this is accomplished by use of A. C. motors synchronized to the line frequency. Where a machine is to be used in a situation without access to such power supply, a storage battery must be used as the source of driving power.

It is accordingly a fundamental object of this invention to provide a direct current type motor which can be operated from a battery source in a portable instrument having sufficiently close speed regulation to permit low speed tape drive and hence very economical use of tape.

It is another object of the invention to provide a motor characterized by the fact that it has a permanently magnetized rotor.

Other objects and advantages of the invention will in part be obvious and in part appear hereinafter.

The invention, accordingly, is embodied in a direct current motor characterized by its having a permanent magnet rotor with a plurality of poles, a stator structure having a larger number of poles than the rotor, the whole being connected to a tuned reed control circuit for operation in a manner such that direct drive thereof with closely regulated speed control may be accomplished.

Referring to the drawings,

Figure 1 is an end view of the motor when it is examined in a direction longitudinal to its axis of rotation, the cover thereof being removed;

Figure 2 is a vertical section taken through the motor and passing through its axis of rotation;

Figure 3 is a side view of the motor, showing its external construction and the manner in which it can be mounted to a support;

Figure 4 is a cross section through the commutator taken along the lines 4—4 of Figure 2;

Figure 5 is a sectional view taken along the line 5—5 of Figure 3;

Figure 6 is a detailed sectional view of a commutator brush section;

Figure 7 is an end view of a commutator brush; and

Figure 8 is a diagrammatical illustration relating the circuit connections for the motor to the mechanical construction.

Referring now to Figure 1, 10 represents a mounting base on which the motor case, made up of cover sections 11 and 12, is carried. Within the case, laminated iron core 13 is held by connections 14, 15 and 16. The iron core which makes up the stator on the motor, in this instance, is shown to be formed with an iron core having poles 20, 21, 22, 23, 24, 25, wound with coils designated 20', 21', 22', 23', 24' and 25'. Electrical connection to the coils from the source of power is made through the cable 26. Capacitor 27 and resistor 28 are mounted inside the case for spark suppression.

Rotor 30 is mounted axially in the motor, having poles 31, 32, 33 and 34, the rotor being a single piece of permanently magnetized material and being carried on shaft 35 which is grounded to the case through connection 36. Appropriate material for the rotor is "Alnico," a strongly magnetic aluminum, nickel, cobalt alloy.

As may be seen in some detail in Figure 2, the shaft carries commutator 40, the commutator being characterized by having an insulating element 41 centered on the shaft and conducting segments 42, 43, 44, 45, 46, 47, 48, 49, 50 and 51 mounted thereon. Each of the segments is insulated from the adjacent one on the insulating base. Segments 46 and 51 are active elements oppositely oriented on the shaft and are connected together and grounded through the shaft to the case, each of these elements being twice the width of the other segments of the commutator. The remaining segments are not part of the circuit but merely provide a riding path for the brushes. Two segments, adjacent to 46 and 51, on the breaking side are incorporated into a quench circuit as described below.

Shown also in detail in Figure 2 (and Figure 6) is the contact of one of the brushes with the commutator, the brush consisting of insulating sleeve 60 carrying inner brush support 61 in which is fitted carbon brush 62, which is held in contact with the commutator by spring 63, the whole being kept in place by the screw cap 64. Brush shunt connections are made through the wire connection 65 and lug 66. It should be noted that, electrically speaking, lug 66 is the same as the point 66 within case 11 (Figure 6). This designation is used in the circuit diagram of Figure 8.

The details of the shaft bearing connection to the case and support are shown where the shaft 35 is supported centrally in the case 11 by self aligning bearings 70, and the case itself is mounted through connections 71 and 72 to the supporting bracket 73, which may be a portion of the apparatus in which the motor is housed.

Details of the orientation of the separate brushes with respect to the axis of the motor are shown in Figure 5, wherein the brushes appear individually mounted in the essentially semi-circular collar 80 which is connected to the case 11 for the motor by means of set screws 81 and 82, the structure being such that the brushes maintain a fixed spatial relationship with each other and are adjustable in their circumferential positions on the frame through adjustment of the collar.

Referring to Figure 8, the motor is shown semi-pictorially with associated circuit connections. There the several poles 20, 21, 22, 23, 24, 25 are shown oriented as they are in Figure 1. Windings on the poles are designated 20', 21', 22', 23', 24', 25', respectively. Similarly points 66, 66' and 66" are identified in this schematic showing for they are electrically the same as the points 66 in Figure 6; commutator segments 46 and 51 and their adjacent ones 45 and 50 are also shown.

The circuit is traced as follows. A direct current source 100, controlled by switch 101 is connected to tuned reed 102. Line 103 is carried from the reed to coil 104 which has iron core 105 and then continued to point 66' and brush 2. The end of brush 2 is grounded through condenser 106. Circuit through the brush is completed through commutator segment 51 (shown in contact with the brush in this position) and thence to ground via shaft 35 and ground connection 36.

From point 66' line 103 is carried around pole 24 to form coil 24' and from that coil it is carried to coil 21' diagonally opposite on the stator, and from there back to point 107, one of the contacts of the tuned reed.

The second leg of the circuit is traced through line 110, taken from the reed to coil 20' around pole 20, from which it passes to diagonally opposite pole 23 to form coil 23', and thence to point 66 and brush 1. One end of the brush is grounded through condenser 111. Brush 1 is shown in contact with commutator segment 50 in this orientation, segment 50 forming part of a spark suppression circuit with resistor 50' connected to shaft 35 and to ground through contact 36.

The third leg of the circuit may be traced from contact 115 at the tuned reed, through line 116 to coil 22', around pole 22 and thence to diagonally opposite pole 25 to form coil 25'. Circuit is completed through point 66'' and brush 3. One end of brush 3 is grounded through condenser 117.

Operation of the rotor is also best understood by reference to Figure 8. As shown, when the switch 101 is closed, reed coil 104 is energized from source 100 when its circuit is completed by brush 2 and the reed 102 makes contact with point 107. Coils 21' and 24' are energized through contact 107 and brush 2. Since coils 21' and 24' are arranged to become south poles $N_1$ of the rotor is attracted to stator 21' and $N_2$ to 24'.

Before rotor poles $N_1$ and $N_2$ come on center of 21' and 24', about 5° before, commutator segment 51 leaves brush 2 and contacts brush 3. Reed 102 swings back to normal and contacts 115.

Coils 22' and 25' are then energized through brush 3 and reed 102, and contact 115. Rotor pole $N_1$ is attracted to stator pole 22 and $N_2$ to 25, i. e. the rotor moves about 60° more.

Before rotor poles $N_1$ and $N_2$ come on center of 22 and 25, about 5° before, commutator segment 51 leaves brush 3 and commutator segment 46 contacts brush 1 energizing coils 20' and 23'. Rotor pole $N_1$ is attracted to stator pole 23' and $N_2$ to 20', i. e. the rotor moves about 60° more.

Commutator segment 46 then leaves brush 1 and contacts brush 2 as described in connection with the movement of commutator segment 51. The rotor moves through 180° on segment 46 as it did on segment 50.

In operation of the motor, the reed makes two complete cycles per revolution and, up to the resonant frequency of the reed, it follows pulses from brush 2.

If the rotor speed becomes somewhat greater than the resonant frequency of the reed divided by two, contacts 107 and 115 are not made at the proper instants and coils 21'—24' and 22'—25' are not energized. That is, the rotor would be 60° ahead of the reed resonant frequency divided by two.

Since coil pairs 21'—24' and 22'—25' represent ⅔ of the power input to the motor and the reed controls the power input to these coil pairs above resonant speed/2, the rotor speed in revolutions per minute may be expressed as follows:

$$R.\ P.\ M. = \frac{\text{Reed Resonance}}{2} \times 60$$

For example, using a reed having a resonant speed of 80 cycles per second—

$$R.\ P.\ M. = \frac{80}{2} \times 60 = 2400$$

Resistors 50' and 45' connecting commutator segments 50 and 45 to ground through the shaft, and condensers 111, 106 and 117 serve to quench the inductive arc produced when the circuit to the coils is broken.

It will be seen from the description of the motor and its construction and operation that certain advantages accrue in its use in the types of applications described. Specifically, the attainment of constant speed in an electric motor driven from a direct current source is possible with speed regulation refined to one-half of one percent or better. Furthermore, the physical construction which places the coils in the stator makes connection to the source of supply quite simple.

Speed control in a motor made in accordance with the invention can also be achieved or varied by using a stator having a larger number of poles so that the increments of movement of the rotor are smaller.

Normally, in a conventional direct current motor many brushes are used in the commutator connections. In the fractional horsepower sizes 28 to 30 segments in the commutator will be found. In the design of motor which has been described there are actually only half as many active segments in the commutator as there are poles in the rotor, and in the specific embodiment described there are only two.

By employing a reed to develop pulsating unidirectional current derived from a direct current source and driving a motor built in accordance with the embodiment described a high degree of speed control is achieved. With a tuned reed the motor speed locks to the frequency of the reed, regardless of the load.

Referring back to Figure 5 of the drawings, it will be noted that the exact placement of the brushes is related to the field poles and the placement of the commutator segments is related to the poles of the rotor. The number of brushes is half the number of field poles, and in the specific instance shown there are six field poles with three brushes which are arranged to be 60° apart; that is, the field poles in the specific instance shown are 60° apart. The brushes are aligned with the spaces between the field poles. With this combination of circumstances the live segment of the commutator is on center with the poles and is perpendicular to the opposite pole within plus or minus 5° for accurate speed control of the motor.

Though the invention has been described with reference to only a single embodiment, it is to be understood that variations thereof may be developed without departing from its spirit or scope.

What is claimed is:

1. An electric motor for operation with square wave alternating current, characterized by its accurate speed regulation, comprising a stator and a rotor, said stator comprising a frame, poles in said frame, coils wound around said poles arranged in pairs around the frame thereof, the rotor being formed of a single piece of permanently magnetized material having alternate north and south poles around the circumference thereof, the number of pairs of poles in said rotor being smaller than the number of pairs of poles in said stator by an integral multiple of 2, the coil circuit to said stator being completed through brushes contacting a commutator mounted on the shaft of said motor, the number of brushes being half the number of poles in said stator.

2. An electric motor comprising a casing, a soft iron core mounted within said casing, said core having a plurality of poles around its circumference, said poles being wound so that diametrically opposite poles are alike, a shaft carried within said casing and a rotor mounted on said shaft, the rotor having a plurality of pairs of poles smaller than the number of pairs of poles in said stator by an integral multiple of 2, said rotor being formed of a single piece of permanently magnetized material, the circuits for said coils being completed through brushes and a commutator mounted on said shaft, the number of brushes being half the number of stator poles.

3. An electric motor characterized by the high degree of speed control obtainable therewith, which comprises a casing, an axial shaft in said casing, a permanently magnetized, single piece, multiple pole rotor thereon and a soft iron stator mounted within said frame, poles formed in said stator and coils wound around said poles, said coils being wound in pairs, like poles being diametrically opposite from each other, an electrical circuit providing square wave alternating current to said coils through a tuned reed, said circuit successively activating pairs of poles in said stator, the circuit being completed through commutator brushes and then to ground.

4. The motor in accordance with claim 3, in which the number of poles in said rotor is four, the number of poles in the stator is six and the number of brushes is three.

References Cited in the file of this patent

UNITED STATES PATENTS

| | | |
|---|---|---|
| 2,437,428 | Hornbostel | Mar. 9, 1948 |
| 2,568,100 | Vanderleck | Sept. 18, 1951 |
| 2,596,711 | Mueller | May 13, 1952 |
| 2,624,017 | Putnocky | Dec. 30, 1952 |